United States Patent
Mussell et al.

(12) 
(10) Patent No.: US 6,191,211 B1
(45) Date of Patent: *Feb. 20, 2001

(54) QUICK-SET FILM-FORMING COMPOSITIONS

(75) Inventors: Robert D. Mussell; Gene D. Rose; Donald L. Schmidt, all of Midland, MI (US)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 29 days.

(21) Appl. No.: 09/151,933

(22) Filed: Sep. 11, 1998

(51) Int. Cl.$^7$ .............................. C08L 39/00; C08L 33/02

(52) U.S. Cl. ..................... 524/555; 524/544; 524/547; 524/556; 526/310

(58) Field of Search ................................. 524/555, 544, 524/547, 556; 526/245, 310

(56) References Cited

U.S. PATENT DOCUMENTS

| | | | |
|---|---|---|---|
| 3,947,396 | 3/1976 | Kangas et al. | 260/29.3 |
| 3,948,979 | 4/1976 | Patterson | 260/486 R |
| 4,140,664 | 2/1979 | Mizuguchi et al. | 260/29.4 UA |
| 4,544,697 | 10/1985 | Pickelman et al. | 524/458 |
| 4,544,723 | 10/1985 | Upson et al. | 524/347 |
| 4,582,663 | 4/1986 | Pickelman et al. | 264/517 |
| 4,622,360 | 11/1986 | Gomi et al. | 524/507 |
| 4,704,324 | 11/1987 | Davis et al. | 428/308.4 |
| 4,783,224 | 11/1988 | Sako et al. | 148/6.27 |
| 4,784,789 | 11/1988 | Jeschke et al. | 252/174.23 |
| 4,814,101 | 3/1989 | Schieferstein et al. | 252/174.23 |
| 4,839,166 | 6/1989 | Grollier et al. | 424/71 |
| 4,859,384 | 8/1989 | Fibiger et al. | 264/45.1 |
| 4,929,666 | 5/1990 | Schmidt et al. | 524/516 |
| 5,013,769 | 5/1991 | Murray et al. | 523/111 |
| 5,075,399 | 12/1991 | Ahmed et al. | 526/287 |
| 5,098,699 | 3/1992 | Hayama et al. | 424/71 |
| 5,116,921 | 5/1992 | Hsieh | 526/287 |
| 5,130,389 | 7/1992 | Ahmed et al. | 526/240 |
| 5,216,098 | 6/1993 | Ahmed et al. | 526/288 |
| 5,252,692 | 10/1993 | Lovy et al. | 526/342 |
| 5,310,581 | 5/1994 | Schmidt et al. | 427/558 |
| 5,354,481 | 10/1994 | Neff et al. | 210/734 |
| 5,354,806 | 10/1994 | Hsieh | 524/547 |
| 5,464,538 | 11/1995 | Schmidt et al. | 210/490 |
| 5,470,908 | 11/1995 | Schmidt et al. | 524/520 |
| 5,527,853 | 6/1996 | Landy et al. | 524/521 |
| 5,578,598 | 11/1996 | Abe et al. | 514/255 |
| 5,580,650 | 12/1996 | Forgach et al. | 428/304.4 |
| 5,609,862 | 3/1997 | Chen et al. | 424/70.11 |
| 5,639,814 | 6/1997 | VanBuskirk et al. | 524/389 |
| 5,652,296 * | 7/1997 | Randen | 524/555 |
| 5,674,934 | 10/1997 | Schmidt et al. | 524/555 |

FOREIGN PATENT DOCUMENTS

| | | |
|---|---|---|
| 44 01 708 | 7/1995 | (DE) . |
| 0 000 426 | 1/1979 | (EP) . |
| 61-012609 | 1/1986 | (JP) . |
| 2-215871 | 8/1990 | (JP) . |
| 7809940 | 5/1979 | (NL) . |
| 97/31042 | 8/1997 | (WO) . |

OTHER PUBLICATIONS

JP 60 192717, Oct. 1985.
Chemical Reg. No. 45076–54–8.
Chemical Reg. No. 51441–64–6.
Chemical Reg. No. 63810–34–4.
Chemical Reg. No. 73082–48–1.
Chemical Reg. No. 82667–45–6.
Chemical Reg. No. 93926–67–1.
Chemical Reg. No. 122988–32–3.
Chemical Reg. No. 145425–78–1.
Chemical Reg. No. 149186–03–8.
Chemical Reg. No. 151938–12–4.
Chemical Reg. No. 166740–88–1.
Daniels, E. S., et al., "Development of Cohesive Strength in Polymer Films From Latices: Effect of Polymer Chain Interdiffusion and Crosslinking", Progress in Organic Coatings, vol. 19, pp. 359–378 (1991).
Hansen, Charles M., "The Three Dimensional Solubility Parameter—Key to Paint Component Affinities: II and III—II. Dyes, Emulsifiers, Mutual Solubility and Compatibility, and Pigments", J. Paint Technology, vol. 39, No. 511, pp. 505–510 (Aug. 1967).
Kötz, J., et al., "Polyanion–polycation–complex Formation of Charged Microgels and Latices With Oppositely Charged Polyelectrolytes in Solution", Acta Polymer, vol. 43, pp. 193–198 (1992).

(List continued on next page.)

Primary Examiner—Tae Yoon
(74) Attorney, Agent, or Firm—Reid S. Willis

(57) ABSTRACT

The present invention relates to a quick set composition and a method for preparing the composition. The composition comprises an aqueous sol of a polymer having a backbone that contains pendant cationic groups and pendant acid groups. The sol is prepared by forming a solution of a polymer that contains pendant cationic groups and pendant acid groups in an aqueous-based solvent that contains water and a suitable organic solvent and removing a sufficient amount of the organic solvent from the solution to form a composition characterized by being reversibly dissolvable and reconstitutable by addition and removal of a suitable organic solvent. The composition of the present invention provides quick-set films that can be prepared in the absence additional surface active agents and with a substantial absence of organic solvents.

3 Claims, No Drawings

OTHER PUBLICATIONS

Ooka, M., et al., "Recent Developments in Crosslinking Technology for Coating Resins", Progress in Organic Coatings, vol. 23, pp. 325–338 (1994).

Padget, J. C., "Polymers for Water–Based Coatings—A Systematic Overview", Journal of Coatings Technology, vol. 66, No. 839, pp. 89–105 (Dec. 1994).

Shalbayeva, G. B., et al., "Conditions of Formation and Properties of Polymer Mixtures of Polyelectrolyte Complexes and Acrylate Latexes", Polymer Science U.S.S.R., vol. 26, No. 6, pp. 1421–1427 (1984).

Van Dyk, John W., et al., "Solubility, Solvency, and Solubility Parameters", Ind. Eng. Chem. Prod. Res. Dev., vol. 24, pp. 473–477 (1985).

* cited by examiner

QUICK-SET FILM-FORMING COMPOSITIONS

BACKGROUND OF THE INVENTION

The present invention relates to a water-dispersible polymeric composition that can be used to prepare quick-set films or coatings.

Coatings provide protective barriers for a variety of things including floors, automobiles, exteriors and interiors of houses, and human skin. Protective coatings for floors, for example, have been known since the mid 1950s. Many of the early coating materials were applied using petroleum- or naphthene-based solvents and as such were undesirable due to the toxicity and flammability of these solvents.

Water-based synthetic emulsion compositions, such as styrene resin emulsions, styreneacrylate copolymer resin emulsions, and acrylate emulsions, developed in the early 1960s, gradually replaced organic solvent-based compositions. Although these water-based compositions are less toxic and more environmentally friendly than organic solvent-based compositions, the water-based compositions tend to be slow to set and difficult to remove in an application where removability is desired. Removal of coatings may be desirable because even the most durable coatings tend to deteriorate due to soiling or wear and tear. In other applications, such as protective care products for the skin, the advantages of water-based removable coatings are obvious.

Removable, water-based coatings are known. For example, polymers that contain ammonium carboxylate functionality are water compatible, but become incompatible through the loss of solvent and ammonia.

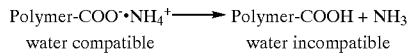

Coatings made by the above-illustrated process can be subsequently removed by contact with an aqueous alkaline liquid, which converts the acid back into the compatible salt.

For example, in U.S. Pat. No. 4,622,360, Gomi et al. discloses a removable water-borne polyurethane resin containing carboxyl groups. Coating compositions can be prepared by adding a polyvalent complex-forming metal to the water-borne resin. The polyvalent metal forms a stable water-dispersible complex with an amine or ammonia in the aqueous solution. When the dispersion is applied to a floor surface, noxious volatile materials evaporate to allow the polyvalent metal ions to initiate a crosslinking of two or more carboxyl groups, thereby forming a hardened, water-incompatible coating. This hardened coating can be removed, but only with a harsh alkaline solution containing ligands such as ethylene diamine tetraacetic acid.

The ammonium carboxylate coating suffers from several disadvantages: 1) the formulations are malodorous and irritating to the eyes and skin; 2) long set times are required to attain acceptable physical properties of the coating; and 3) the removal or stripping process requires the use of hazardous alkaline liquids.

In view of the deficiencies of the known art, it would be desirable to have a composition that provides a quick-set film or coating that can be removed without the use of harsh chemicals in applications where such removal is desirable. It would further be desirable to render such a coating resistant to common organic solvents in applications where general solvent resistance is desired.

It would further be useful to have a hypoallergenic, non-toxic, water-based composition that provides a coating that gives long-lasting protection to the skin against sun, dryness, and harsh chemicals.

SUMMARY OF THE INVENTION

The present invention is a composition comprising an aqueous-based sol of a polymer having a backbone that contains pendant cationic groups and pendant acid groups, which sol is prepared by the steps of:
  a) forming a solution of a polymer that contains pendant cationic groups and pendant acid groups in an aqueous-based solvent for the polymer, which solvent contains a first organic solvent; and
  b) removing a sufficient amount of the first organic solvent from the solution to form a composition characterized by being reversibly dissolvable and reconstitutable by addition and removal of a second organic solvent.

In a second aspect, the present invention is a method of coating a substrate comprising the step of applying to a surface of the substrate a composition containing a water-compatible coalescing agent and an aqueous-based sol of a polymer having a backbone that contains pendant cationic groups and pendant acid groups, wherein the sol is prepared by the steps that comprise:
  a) forming an aqueous-based solution of the polymer, which solution contains an organic solvent;
  b) removing a sufficient amount of the organic solvent from the solution to form a composition having a minimum solids content such that the viscosity of the sol is less than half the viscosity of the solution having the same solids content;
wherein the coalescing agent is an organic liquid having a boiling point greater than 100° C.

In a third aspect the present invention is a composition comprising an aqueous-based sol of a polymer having a backbone that contains pendant cationic groups and pendant acid groups wherein the sol is further characterized by being reversibly dissolvable and reconstitutable by addition and removal of an organic solvent for the sol.

The composition of the present invention provides quick-set films that can be prepared in the absence of additional surface active agents and with a substantial absence of organic solvents. The sol affords a higher concentration of solids at considerably lower viscosities than a corresponding solution.

DETAILED DESCRIPTION OF THE INVENTION

The composition of the present invention comprises an aqueous-based sol of a polymer having a backbone that contains pendant cationic groups and pendant acid groups.

As used herein, the terms "aqueous-based sol" or "sol" refer to a suspension of the polymer in a water-containing medium. The medium must include water, and may include a suitable organic solvent. The sol is characterized by being reversibly dissolvable and reconstitutable (that is, returned to the sol state) by addition and subsequent removal of a suitable organic solvent, which may be the same as or different from the organic solvent that may be present in the sol. It is also possible to remove all of the aqueous-based solvent from the sol to form a solid, and then reconstitute the sol by dissolving the solid in a suitable aqueous-based solvent, then removing a sufficient amount of the organic solvent (and optionally adding sufficient water) to reconstitute the sol. The suspended particles preferably have an average particle size (as measured by a Coulter Model N4MD Sub-Micron Particle Analyzer) of not less than 10 nm, and more preferably not less than about 20 nm, and preferably not more than about 500 nm, more preferably not more than about 300 nm, and most preferably not more than 200 nm.

The dissolved polymer is differentiated from the sol by the differences in the viscosities of the two compositions at a given minimum polymer concentration and the amount of organic solvent needed to form a solution. Specifically, the viscosity of the sol is preferably less than half, more preferably less than one-third, and most preferably less than one-tenth the viscosity of the dissolved polymer at a polymer concentration of not less than about 5 weight, more preferably not less than about 10 percent, based on the weight of the solution or sol. Furthermore, the minimum amount of organic solvent required to form a solution is greater than the maximum amount of organic solvent required by a sol. Specifically, the minimum amount of organic solvent required to form a solution is typically greater than 20 weight percent based on the weight of the polymer and the aqueous-based solvent. On the other hand, the maximum amount of the organic solvent required by a sol is typically less than 20, more preferably less than 10, and most preferably less than 6 weight based on the weight of the polymer and the sol.

The polymer is characterized by containing pendant cationic groups and pendant acid groups. Generally, these pendant groups can be formed from the polymerization of a polymerizable cationic monomer, preferably a strong cationic monomer, and a polymerizable acid monomer, which may be a strong acid or a weak acid monomer. As used herein, the term "strong cationic monomer" refers to a monomer that contains ethylenic unsaturation and a cationic group having a charge that is independent of pH. The term "polymerizable acid monomer" refers to a monomer that contains ethylenic unsaturation and an acid group.

In addition to containing pendant cationic and acid groups, the polymer preferably includes structural units that can be formed from the polymerization of a polymerizable non-interfering monomer. The term "polymerizable non-interfering monomer" is used herein to refer to an uncharged monomer that does not adversely affect the formation and properties of a film or a coating prepared from the sol. The term "structural units formed from the polymerization of a polymerizable . . . monomer" is illustrated by the following example:

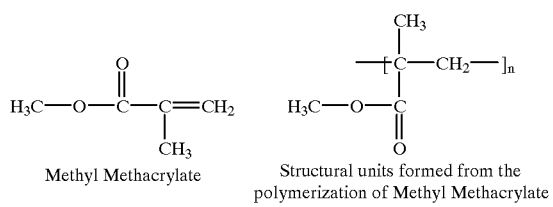

Methyl Methacrylate     Structural units formed from the polymerization of Methyl Methacrylate Polymerizable acid monomers that are suitable for the preparation of the dispersion used to prepare the quick-set coating include ethylenically unsaturated compounds having carboxylic acid, phenolic, thiophenolic, phosphinyl, sulfonic acid, sulfinic acid, phosphonic, or sulfonamide functionality, or a combination thereof. Preferred polymerizable acid monomers include acrylic acid, methacrylic acid, itaconic acid, β-carboxyethyl acrylate (usually as a mixture of acrylic acid oligomers), vinylbenzoic acid, vinylchlorophenol, vinylbromophenol, vinylthiophenol, 2-propenoic acid: 2-methyl-, (hydroxyphosphinyl) methyl ester, vinylphosphonic acid, 2-acrylamido-2-methyl-1-propane sulfonic acid, and 2-sulfoethylmethacrylate. Acrylic acid, methacrylic acid, 2-acrylamido-2-methyl-1-propane sulfonic acid, and vinylphosphonic acid are more preferred acid monomers, and acrylic acid, and methacrylic acid are most preferred.

The polymerizable cationic monomer is associated with a counterion, for example, halide such as chloride or bromide, nitrate, phosphate, carbonate, bicarbonate, acrylate, methacryate, or sulfate. Suitable polymerizable strong cationic monomers include salts of ethylenically unsaturated compounds having quaternary ammonium, sulfonium, cyclic sulfonium, and phosphonium functionality. Examples of suitable monomers having quaternary ammonium functionality include ethylenically unsaturated trialkylammonium salts such as vinylbenzyl tri-$C_1$–$C_4$-alkylammonium chloride or bromide; trialkylammoniumalkyl acrylates or methacrylates such as 2-[(methacryloyloxy)ethyl] trimethylammonium chloride and N,N-diethyl-N-methyl-2-[(1-oxo-2-propenyl)oxy]ethanaminium methyl sulfate (Chem. Abstracts Reg. No. 45076-54-8); and trialkylammoniumalkyl acrylamides such as N,N,N-trimethyl-3-[(2-methyl-1-oxo-2-propenyl) amino]-1-propanaminium chloride (Chem. Abstracts Reg. No. 51441-64-6) and N, N-dimethyl-N-[3-[(2-methyl-1-oxo-2-propenyl)amino] propyl]-benzenemethaminium chloride (Chem. Abstracts Reg. No. 122988-32-3). A preferred polymerizable quaternary ammonium salt is 2-[(methacryloyloxy)ethyl] trimethylammonium chloride.

Other examples of suitable cationic monomers include amine salts such as salts of substituted or unsubstituted aminoalkyl methacrylates and aminoalkyl acrylates. Aminoethyl methacrylate hydrochloride is an example of a suitable amine salt.

Examples of polymerizable unsaturated sulfonium salts include dialkylsulfonium salts such as [4-ethoxy-3-(ethoxycarbonyl)-2-methylene-4-oxobutyl] dimethylsulfonium bromide (Chem. Abstracts Reg. No. 63810-34-4); and vinylbenzyl dialkylsulfonium salts such as vinylbenzyl dimethylsulfonium chloride. Examples of polymerizable cyclic sulfonium salts include 1-[4-[(ethenylphenyl)methoxy]phenyl]tetrahydro-2H-thiopyranium chloride (Chem. Abstracts Reg. No. 93926-67-1); and vinylbenzyl tetrahydrothio-phenonium chloride, which can be prepared by the reaction of vinylbenzyl chloride with tetrahydrothiophene.

Examples of polymerizable phosphonium salts include 2-methacryloxyethyltri-$C_1$–$C_{20}$-alkyl-, aralkyl-, or arylphosphonium salts such as 2-methacryloxyethyltri-n-octadecyl-phosphonium halide (Chem. Abstracts Reg. No. 166740-88-1); tri-$C_1$–$C_{18}$-alkyl-, aralkyl-, or arylvinylbenzylphosphonium salts such as trioctyl-3-vinylbenzylphosphonium chloride, trioctyl-4-vinylbenzylphosphonium chloride (Chem. Abstracts Reg. No. 15138-12-4), tributyl-3-vinylbenzylphosphonium chloride, tributyl-4-vinylbenzylphosphonium chloride (Chem. Abstracts Reg. No. 149186-03-8), triphenyl-3-vinylbenzylphosphonium chloride, and triphenyl-4-vinylbenzylphosphonium chloride (Chem. Abstracts Reg. No. 145425-78-1); $C_3$–$C_{18}$-alkenyltrialkyl-, aralkyl-, or aryl-phosphonium salts such as 7-octenyltriphenyl-phosphonium bromide (Chem. Abstracts Reg. No. 82667-45-6); and tris(hydroxymethyl)-(1-hydroxy-2-propenyl) phosphonium salts (Chem. Abstracts Reg. No. 73082-48-1).

The polymer that contains pendant cationic groups and acid groups can also be prepared from a monomer that contains both an acid group and a strong cationic group. Examples of such monomers include N-(4-carboxy)benzyl-N,N-dimethyl -2-[(2-methyl-1-oxo-2-propenyl)-oxy] ethanaminium chloride and N-(3-sulfopropyl)-N-methacroyloxyethyl-N,N-dimethyl ammonium betaine.

It is also possible to prepare a polymer that contains cationic groups and acid groups by adding cationic functionality to an already prepared polymer. For example, a polymerizable monomer having a weak acid group can be copolymerized with a polymerizable non-interfering monomer containing an electrophilic group, such as vinylbenzyl halide or glycidyl methacrylate, to form a polymer having a weak acid group and an electrophilic group. This polymer can then be post-reacted with a nucleophile such as a tertiary amine, pyridine, a dialkyl sulfide, or a cyclic sulfide, which can displace the halide group or open the oxirane ring and form an onium salt. An example of the formation of a benzylonium salt is illustrated as follows:

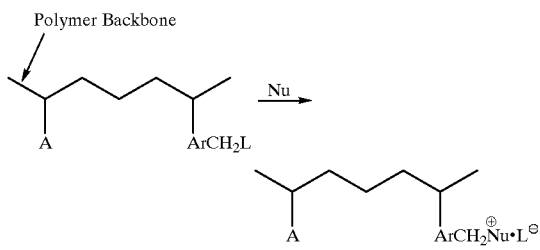

where A is a pendant weak acid group; Ar is an aromatic group, preferably a phenyl group; L is a leaving group, preferably a halide group, more preferably a chloride group; and Nu is the nucleophile.

In another example of adding cationic functionality to an already prepared polymer, a polymer backbone that contains pendant acid groups and a tertiary amine or a sulfide can be post-reacted with an alkylating reagent such as an alkyl halide to form a polymer that contains acid groups and strong cationic groups:

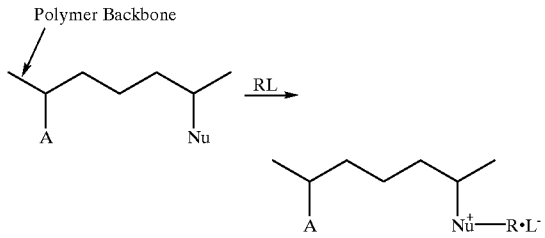

where RL is an alkylating reagent.

Examples of non-interfering polymerizable monomers include acrylates such as methyl acrylate, ethyl acrylate, butyl acrylate, 2-ethylhexyl acrylate, 2-hydroxyethyl acrylate, 2-hydroxypropyl acrylate, glycidyl acrylate, and allyl acrylate; methacrylates such as methyl methacrylate, ethyl methacrylate, butyl methacrylate, allyl methacrylate, glycidyl methacrylate, 2-hydroxyethyl methacrylate, polypropylene glycol monomethacrylate, and 2-hydroxypropyl methacrylate; alkenyl aromatic hydrocarbons such as 4-methacryloxy-2-hydroxy-benzophenone, 2-(2'-hydroxy-5-methacrylyloxyethylphenyl)-2H-benzotriazole; and an alkenyl aromatic hydrocarbon, or $C_1$–$C_4$ alkyl- or alkenyl-substituted styrenes, preferably styrene, α-methylstyrene, vinyltoluene, and vinylbenzyl chloride. Other examples of non-interfering species $C_3$–$C_{18}$-perfluoroalkyl methacrylates such as 2-(perfluorooctyl)ethyl methacrylate; $C_3$–$C_{18}$-perfluoroalkyl acrylates such as 2-[ethyl[(heptadecafluorooctyl)-sulfonyl]amino]ethyl 2-propenoate; and $C_3$–$C_{18}$-perfluoroalkyl vinylbenzenes. (See U.S. Pat. No. 4,929,666, column 4, lines 54 to 68, and column 5, lines I to 30.).

Preferably, the mole ratio of pendant acid groups to pendant cationic groups is not less than about 0.1, more preferably not less than about 0.2, and most preferably not less than about 0.5; and preferably not more than about 10, more preferably not more than about 5, and most preferably not more than about 2.

The preferred mole ratio of the structural units formed from the polymerization of the polymerizable non-interfering monomer to the sum of the structural units formed from the polymerization of the polymerizable acid monomer and the polymerizable cationic monomer (or, alternatively, the sum of the pendant acid groups and the cationic groups) is preferably not less than 70:30, more preferably not less than 80:20, and most preferably not less than 85:15; and preferably not greater than 99:1, and more preferably not greater than 98:2, and most preferably not greater than 95:5.

Typically the polymer has a number average molecular weight in the range of from about 1000 to about 200,000 Daltons, preferably from about 8000 to about 50,000 Daltons.

The composition of the present invention can be prepared by the steps of polymerizing the acid monomer, the cationic monomer, and preferably the non-interfering monomer in the presence of water and a sufficient amount of an organic solvent for the polymer to form a solution of the subsequently formed polymer. An organic solvent useful for forming an aqueous-based solution of the polymer is one that a) forms a single phase with water in the concentrations used; b) is substantially completely removable from the solution, preferably by rotary evaporation, without completely removing the water; and c) is, in some combination with water, a solvent for the polymer. More preferably, the organic solvent has a boiling point of less than 100° C. It is to be understood that the suitable solvent may be a combination of organic solvents.

Examples of organic solvents useful for the polymerization include ethers, alcohols, esters, nitrites, and ketones, and combinations thereof. Examples of more preferred organic solvents include methanol, ethanol, 1-propanol, 2-propanol, 2-methyl-2-propanol, 2-methyl-1-propanol, 1-butanol, and propylene glycol methyl ether, ethyl acetate, acetonitrile, or combinations thereof. Preferably, the amount of organic solvent used in the polymerization step is not less than 20, more preferably not less than 30, and most preferably not less than 40 weight percent based on the weight of water and the solvent; and preferably not greater than 80, more preferably not greater than 70, and most preferably not greater than 60 weight percent based on the weight of polymer and aqueous-based solvent. The polymerization reaction generally is carried out at elevated temperatures, typically between about 50° C. and about 100° C., and in the presence of a polymerization initiator.

Upon completion of polymerization, a sufficient amount of the organic solvent is removed to form the sol. Solvent removal can be accomplished in a number of different ways. In one method, the aqueous-based solution containing the polymer is preferably cooled, and the solids content determined so that a sol with a desired solids content can readily be prepared. The solution may optionally be diluted with water and an organic solvent to maintain a solution and to achieve the final desired sol concentration upon subsequent removal of the organic solvent. The organic solvent is characterized by being completely removable, or almost completely removable, without completely removing the water; the concomitant addition of water and removal of organic solvent is preferred. A sufficient amount of the organic solvent can then be removed, preferably in vacuo, to form a sol having a solids content of preferably not less than 5 percent, more preferably not less than 10 percent, and most preferably not less than 20 percent based on the weight of water and the polymer. Both the organic solvent that was used along with water to form the polymer solution and the solvent that was added after completion of polymerization (which may or may not be the same solvent) can be removed. Preferably the total amount of organic solvent removed in the solvent removal step is at least 90 percent, more preferably at least 95 percent. Thus, the sol is preferably substantially free of organic solvent.

In another method of preparing the sol, the organic solvent may be removed by steam stripping. In this technique, it may be desirable to add additional water during stripping to adjust the solids content.

The aqueous-based sol of the present invention can generally be distinguished from an emulsion polymerized aqueous dispersion (latex) of a polymer having pendant cationic groups and pendant acid groups in a number of ways. First, unlike the latex, the polymer particles dispersed in the sol can be dissolved in a suitable organic solvent (or a suitable aqueous-based solvent such as the solvent used to form the sol), and reconstituted, or concentrated to a gel and diluted to re-form the sol, or concentrated to a solid then redissolved to form a solution, which can then be reconstituted to form the sol. The suitable organic solvent can be the same as or different from the organic solvent that is used with water to dissolve the polymer.

Second, the preferred sol of the present invention is even further distinguished from the corresponding latex in that the sol is preferably prepared in the substantial absence of any additional surface active agent (that is, not more than 0.5 percent, preferably not more than 0.1 percent of an added surfactant) while the latex is preferably prepared in the presence of greater than 0.5 weight percent levels of an additional surface active agent. The term "additional surface active agent" refers to surface active agents other than the pendant cationic and acid groups of the polymer, or the polymerizable cationic and acid monomers used to prepare the polymer.

Third, the preferred number average molecular weight of the sol is less than 50,000 Daltons while the latex tends to have a molecular weight that exceeds 100,000 Daltons.

One notable advantage of the sol as compared to the solution is that a higher percent solids composition can be prepared without detrimental effects on the the viscosity. A higher solids loading is beneficial because these more concentrated sols exhibit more desirable physical properties. Whereas solutions having a solids content of greater than 20 percent are impracticle because of their high viscosity, the preferred sol flows easily at a solids content of 20 percent and even higher. Moreover, the sol is preferably substantially absent of organic solvents, except perhaps for a minimum amount that may be added as a coalescing agent to the final coating formulation.

A coalescing agent may be advantageously combined with the sol, particularly if it is necessary to reduce the minimum film-forming temperature. The coalescing agent is an organic solvent, or combination of organic solvents, which function to give a clear adherent film. The coalescing agent is typically a high boiling organic liquid preferably having a boiling point that is greater than 100° C. The coalescing agent is also water compatible, that is to say, water-soluble at the concentrations used, or, in combination with another coalescing agent, water-soluble at the concentrations used. When the coalescing agent is used, the amount added is preferably not more than 20 weight percent, more preferably not more than 10 weight percent, and most preferably not more than 6 weight percent, based on the weight of the sol and the coalescing agent. Preferred coalescing agents include glycol ethers, dibasic esters, nitrites, carbonates, sulfoxides, amides, pyrrolidones, and combinations thereof. Examples of more preferred coalescing agents include benzonitrile, dimethyl succinate, dimethyl glutarate, dimethyl adipate, dipropylene glycol dimethyl ether, propylene glycol n-butyl ether, dipropylene glycol n-butyl ether, dipropylene glycol n-propyl ether, propylene glycol methyl ether acetate, dipropylene glycol dimethyl ether, dimethyl formamide, dimethylsulfoxide, propylene carbonate, N-methyl-2-pyrrolidone, ethylene glycol phenyl ether, diethylene glycol methyl ether, diethylene glycol n-butyl ether, ethylene glycol n-butyl ether, propylene glycol n-propyl ether, propylene glycol phenyl ether, dipropylene glycol methyl ether acetate, tripropylene glycol methyl ether, dipropylene glycol methyl ether and propylene carbonate, and combinations thereof.

The coalescing agent may be added at any time during the process for preparing the sol, including during the polymerization step. If the agent is added during the polymerization step, a sufficient amount of the agent is advantageously removed to both a) form the sol; and b) maintain coalescing capabilities.

The coatings described thus far are resistant to water, but can easily be removed with a mixture of solvents or a combination of acid and solvent, such as a combination of water and an organic solvent, more preferably water and 1-propanol. These coatings can be rendered substantially permanent, that is, resistant to removal by organic solvents as well as aqueous-based acids or bases, in at least three ways. First, an effective amount of a crosslinking reagent, such as a melamine resin, an epoxy resin, or a diamine, may be added to react with the functional groups on the polymer to form a covalent crosslink; second, a polymerizable acid such as acrylic acid or methacrylic acid, may be added to the composition, which can then be subsequently cured; and third, the polymer may be designed to include a pendant crosslinkable functional group such as a polymerizable ethylenically or acetylenically unsaturated group, a sulfonium group, an epoxy group, or 2-oxazoline. An example of a preparation of a polymer that contains ethylenic unsaturation is illustrated as follows:

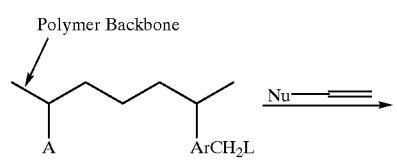

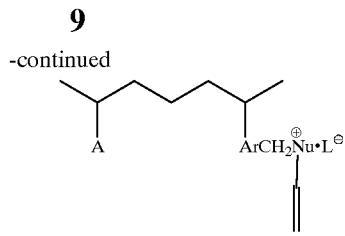

where Nu——= is a nucleophile (such as a tertiary amine or a sulfide) that contains ethylenic unsaturation; and A, Ar, and L are as previously defined. In the previous illustration, a polymerizable acid monomer, a polymerizable aryl halide, preferably vinylbenzyl chloride and a polymerizable non-interfering monomer are copolymerized to form a polymer having acid groups and benzyl halide groups. The polymer is then reacted with a nucleophile that contains ethylenic unsaturation to impart crosslinking capabilities to the polymer. An example of a suitable nucleophile with ethylenic unsaturation is the following compound:

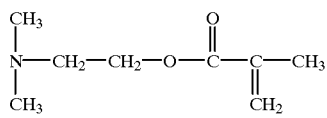

In the case where a polymerizable acid is used as the crosslinking agent, it is preferred that it be added to the inner salt to form a crosslinkable polymer as shown in the following illustration:

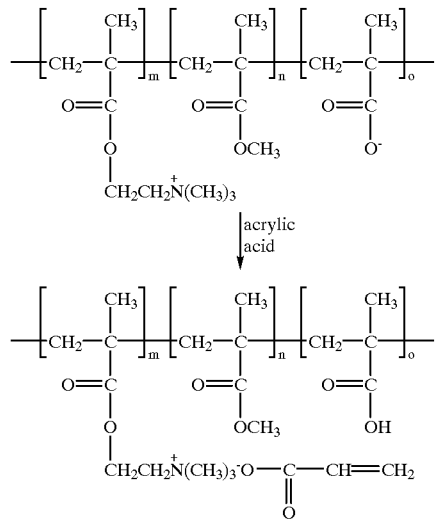

Another example of a polymer that includes a pendant crosslinkable group is a polymer formed by the copolymerization of 2-isopropenyl-2-oxazoline with the polymerizable strong cation monomer and the polymerizable acid monomer.

When the composition that includes a crosslinking agent or a crosslinkable functional group is coated onto a substrate, the coating is preferably allowed to set before means such as free radical initiation or heating or UV radiation is used to promote crosslinking.

It is to be understood that the sol of the present invention can be used in combination with solutions or latexes containing similar polymers to form useful films and coatings. In addition, the composition may include property enhancing additives such as fillers, pigments, leveling agents, viscosity modifiers, wax dispersions, anti-oxidants, or combinations thereof.

The compositions of the present invention can be used, for example, to coat or protect floors, automobile parts, human skin, countertops, wood, furniture, and the interiors or exteriors of houses. The compositions may also include additives such as pigments, dyes, fungicides, or bactericides.

The following example is for illustrative purposes only and is not intended to limit the scope of this invention. All percentages are by weight unless otherwise noted.

EXAMPLE 1

Preparation of a 20 Weight Percent Sol

Water (30 g), 1-propanol (30 g), methylmethacrylate (6.3 g), methacrylic acid (0.3 g), butyl acrylate (2.6 g), and M-Quat (2.6 g, 2-[(methacryloyloxy)ethyl] trimethylammonium chloride, as a 74% active in water, obtained from Bimax, Inc.) were added to a 1-L reaction vessel. The mixture was heated with stirring to 80° C. under nitrogen, whereupon four liquid streams were simultaneously and continuously added to the vessel. The streams were added over a 5-hour period using 100-mL syringes driven by a Sage Instruments syringe pump Model 355 (Cole-Palmer Instrument Company). After the addition was completed, the reaction was maintained at 80° C. for an additional hour. The contents of the four streams are shown in Table 1.

TABLE 1

| Stream No. | Component | Amount |
|---|---|---|
| 1 | Methyl Methacrylate | 56.8 g (0.58 mol) |
|  | Methacrylic Acid | 3.1 g (0.036 mol) |
|  | Butyl Acrylate | 23.0 g (0.18 mol) |
|  | Styrene | 10.5 g (0.1 mol) |
| 2 | M-Quat | 7.5 g (5.6 g active, 0.027 mol) |
|  | Water | 75 g |
| 3 | VAZO ™ 52[a] | 2.00 g |
|  | 1-Propanol | 75 g |
| 4 | 1-propanol | 45 g |
|  | water | 45 g |

[a]2,2'-azobis(2,4-dimethylpentane nitrile) obtained from E. I. duPont de Nemours & Co., Inc.

The polymer solution was cooled and percent solids were determined to be 24.8 percent using a Labwave 9000 Moisture Solids Analyzer (available from CEM Corp., Matthews, N.C.). The viscosity of the sample was 227 cps. A portion of the polymer solution (200 g) was diluted with 1-propanol (49.6 g), and water (49.6 g). The diluted solution was thoroughly mixed, then placed onto a Caframo mixer (available from Fisher Scientific) at 1200 rpms. The sample was diluted further with water (196.8 g) to provide a solution containing 10 percent solids. This dispersion was placed on a rotary evaporator to remove substantially all of the 1-propanol to form a sol containing 25 percent solids, which had a viscosity of 26.6 cps.

What is claimed is:

1. A composition comprising an aqueous suspension of polymer particles having an average particle size of not less than 10 nm and not more than 200 nm, which polymer has a backbone that contains (a) pendant acid groups; (b) pendant cationic groups associated with a counterion selected from the groups consisting of halide, nitrate phosphate, carbonate, bicarbonate, acrylate, methacrylate, and sulfate, and (c) structural units formed from the polymerization of a non-interfering monomer; wherein the ratio of the structural units formed from the polymerization of the non-interfering monomer to the sum of the pendant cationic groups and acid groups is not less than 70:30 and not more than 99:1, wherein the composition is further characterized by containing (d) not more than 0.5 weight percent of an additional surface active agent; and (e) less than 20 weight percent of an organic solvent.

2. The composition of claim 1 which contains not more than 0.1 weight percent of an additional surface active agent.

3. A composition comprising an aqueous suspension of polymer particles having an average particle size of not less than 10 nm and not more than 200 nm, which polymer has a backbone that contains pendant acid groups, pendant cationic groups associated with a labile counterion, and structural units formed from the polymerization of a non-interfering monomer, wherein the ratio of the structural units formed from the polymerization of the non-interfering monomer to the sum of the pendant cationic groups and acid groups is not less than 70:30 and not more than 99:1, wherein the composition is further characterized by containing (a) not more than 0.5 weight percent of an additional surface active agent; and (b) less than 20 weight percent of an organic solvent.

* * * * *